Aug. 6, 1968
KIYOSHI SHIBATA
3,395,721
AUTOMATIC REGULATOR OF LIQUID CLEARING
INCORPORATED IN THE PIPE LINE
Filed April 13, 1964
3 Sheets-Sheet 1
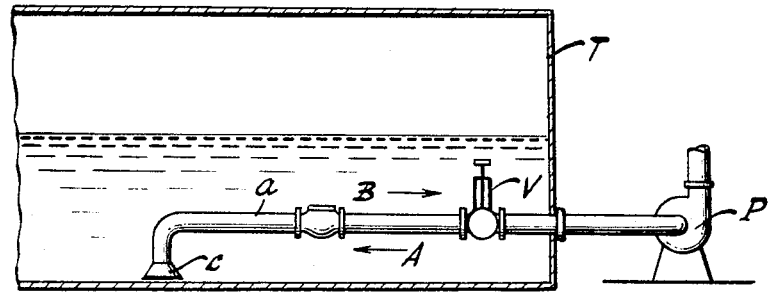
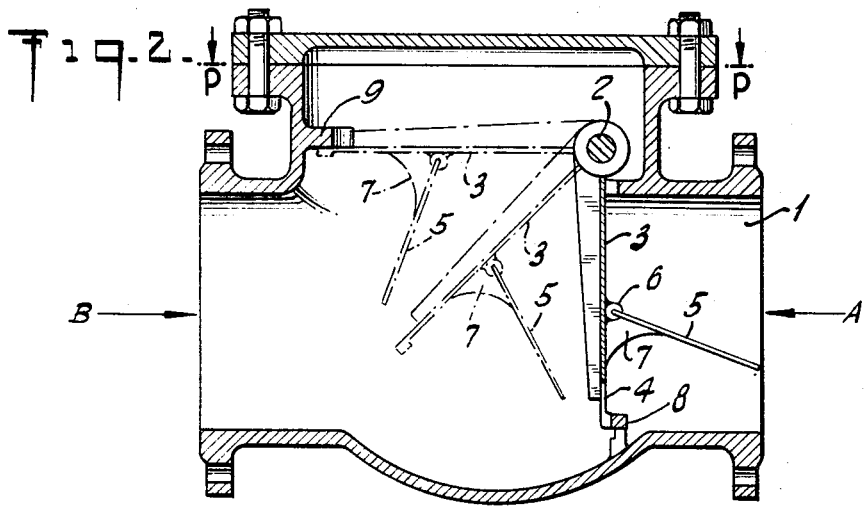
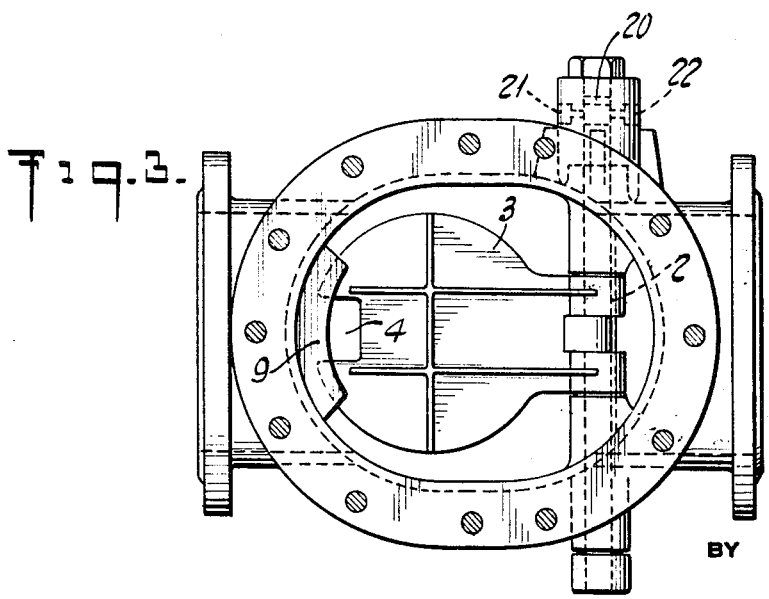
INVENTOR
KIYOSHI SHIBATA
BY
Nolte & Nolte
ATTORNEYS

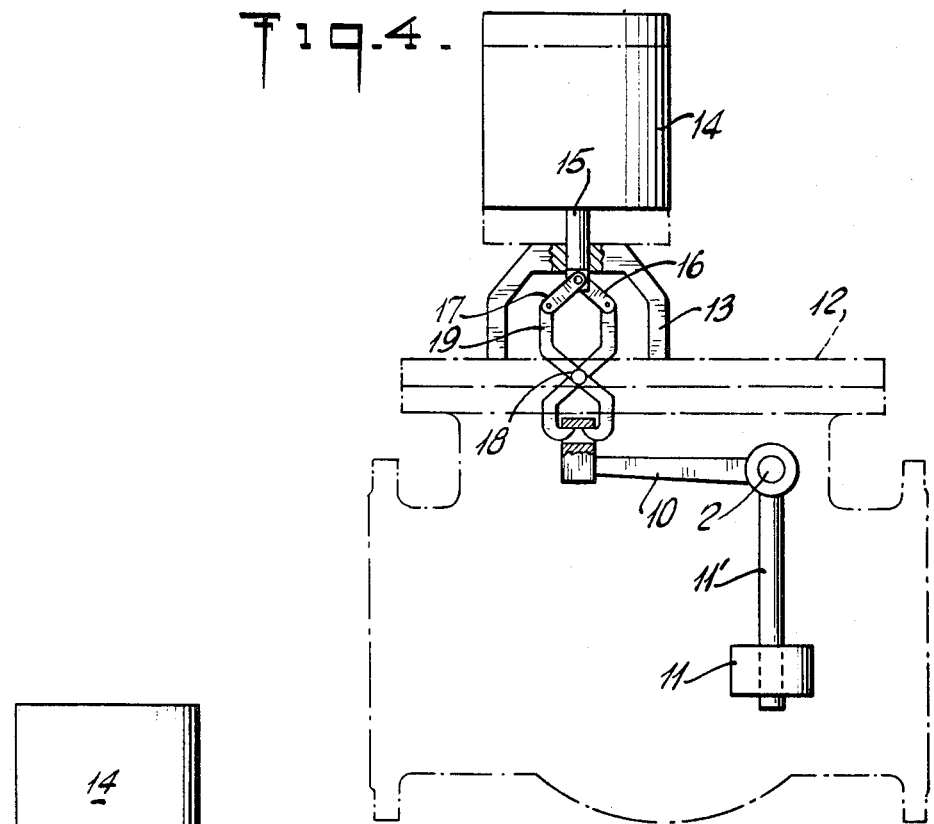
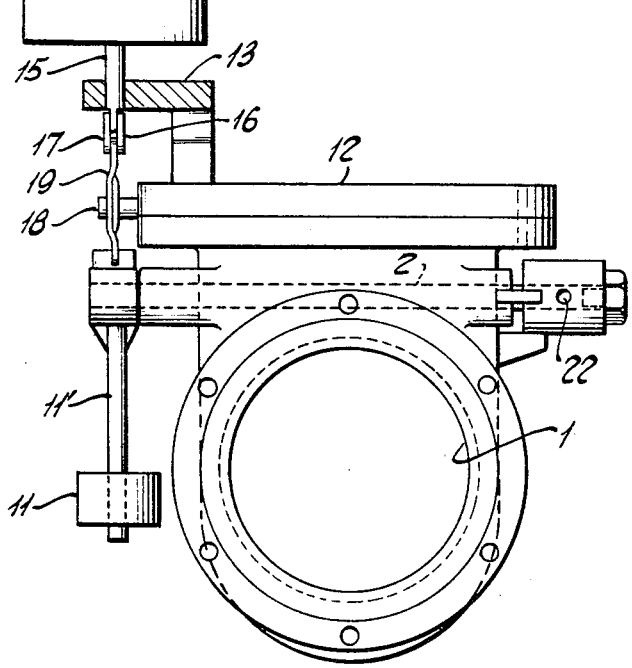

3,395,721
AUTOMATIC REGULATOR OF LIQUID CLEARING INCORPORATED IN THE PIPE LINE
Kiyoshi Shibata, Soka-shi, Saitama-ken, Japan, assignor to Ishikawajima-Harima Jukogyo Kabushiki Kaisha, Tokyo-to, Japan, a company of Japan
Filed Apr. 13, 1964, Ser. No. 359,327
Claims priority, application Japan, Aug. 29, 1963, 38/45,316
4 Claims. (Cl. 137—87)

In pumping liquid out of a tank, for instance, transferring the cargo oil out of a ship into a tank on the land, centrifugal pumps with large capacity have been used in order to save working hours. On occasion, air comes into the pump together with the liquid when the level of liquid has lowered, thus making the pump ineffective because of the characteristics of this kind of pump. To avoid such difficulty, a reciprocating pump, which is installed independently, has hitherto been used so that the bottom layer of liquid can be pumped out. This requires a separate pipe line and pump. Of late, another method has been introduced, where an intermediate negatively pressurized tank is installed. With this system, it is necessary to throttle the valve at the final pumping stage.

In view of such difficulties, the invention aims to provide an automatic regulator for pumping entirely with a centrifugal pump.

An embodiment according to the invention is described with respect to the drawings.

FIG. 1 is the schematic diagram of a pipe line incorporating an embodiment according to the invention.

FIG. 2 is a vertical cross section of the embodiment at the center plane.

FIG. 3 represents a top view partially cut-away at the line P—P of FIG. 2.

FIG. 4 is a front view of the locking mechanism.

FIG. 5 is the end view of the locking mechanism shown in FIG. 4.

Figure 6:
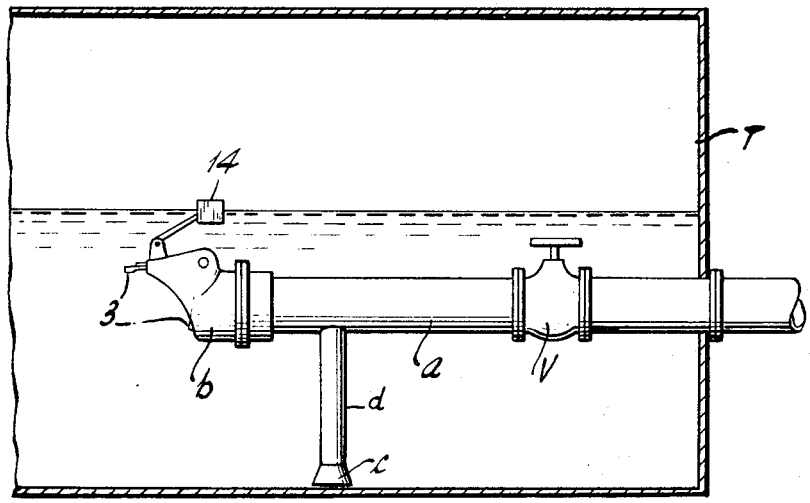
FIG. 6 is the front view of another embodiment incorporated in the pipe line.

1 is the body of the valve. 2 is a shaft passing traversely through the body. 3 is the sealing vane which is formed with an opening 4. 5 is an auxiliary vane fitted onto the vane 3 with a hinge 6, and limited in movement by an arm 7. Similarly the vane 3 is limited in movement by bottom stop 8 and top stop 9.

To the end of the shaft 2, which extends through the body 1, are fixed the lock lever 10 (FIG. 4) and the balance weight lever 11' at right angles to the lock lever 10 and carrying weight 11.

When the body 1 is empty, the balance weight is adjusted to position the sealing vane at 45 degrees to the horizontal line.

On top of the body 1 is fitted the lid 12, on which is set up the guide 13 for the rod 15 of the float 14, allowing the free vertical movement of the rod 15. To the end of the rod 15 are jointed with a pivot pin two links 16 and 17, the other ends of which are pivotally linked to the tongs 19 having a common pivot 18 whose axis is stationary.

Near the other end of the shaft 2, a hole 20 is pierced at right angles to the shaft and at such an inclination that when the sealing vane 3 is at 45 degrees to the horizontal line, it is in line with the holes 21 and 22 (FIG. 3) and that when the vane is in a horizontal or vertical position the holes can be shut by shaft 2.

The hole 21 is connected to a source of compressed air with piping while the hole 22 is connected to the signal generator (not shown in the diagram). To the end of the main pipe a is fixed a bellmouth c at a given distance from the bottom of the tank T as shown in FIG. 1.

The function of the system will be stated below. When the tank T is empty, the body 1 is naturally empty, and the sealing vane 3 is nearly at 45 degres to the level as mentioned above. When liquid flows in the direction of the arrow A as shown in FIG. 1 to fill the tank T, the shaft 2 and the sealing vane 3 in a body turn clockwise by the pressure of the incoming liquid. In case the pressure of the incoming liquid is not adequately high, or if the vane 3 is too heavy for the flow to lift the vane 3 up to the top stop 9, the auxiliary vane 5 which is hanging, is is pressed up by the flow, which in turn lifts the sealing vane 3 upwards until the vane 3 reaches the top stop 9. At this time the lock lever 10 is in a horizontal position, and the balance weight lever 11 vertical, and the tongs are still open with no link with the lock lever 10.

With the continued filling of liquid into the tank T, the surface of liquid rises until the float 14 rises; then the rod 15 is brought up accordingly, pulling up the links 16 and 17 and the tongs 19, whose prongs in turn grip the end of the lock lever 10, securing the sealing vane 3 in a horizontal position (FIG. 4).

When the liquid in the tank T is pumped out in the direction of the arrow B, the sealing vane 3 is locked in the horizontal position while the auxiliary vane 5 is pressed counterclockwise by the flow of liquid.

Since auxiliary vane 5 can turn around the pin 6 in the direction of flow, therefore, auxiilary vane 5 is turned without much high pressure.

When the surface of liquid has been lowered until the float 14 is above the liquid surface and its weight is heavier than its floating force, the float 14 comes down to the lowest position together with the rod 15, which pushes open the links 16 and 17, and consequently in turn the prongs of the tongs 19, which is released off the end of the lock lever 10, and the sealing vane 3 is allowed to turn counterclockwise and pressed against the bottom stopper 8. Thereafter, the liquid flows through the opening 4 of the sealing vane 3, bringing about the same condition as if the valve were throttled during pumping out of the liquid. No particular function is effected by the auxiliary vane at this time except moving freely in accordance with the flow.

When the liquid is completely pumped out, only air flows through the opening 4, and since air is much less viscous than liquid, the sealing vane 3 cannot be pulled to the stop 8 against the balance weight 11, but rises until it is balanced with the weight 11, staying at an angle about 45 degrees to the level line. This position of the sealing vane 3 brings the hole 20 of the axle 2 in line with the holes 21 and 22, allowing compressed air to flow to the signal generator; thereupon the valve V is closed and the centrifugal pump P is stopped.

When the sealing vane 3 comes down from the horizontal position to the vertical position, the holes 20, 21 and 22 are temporarily brought in line which allows the passage of compressed air; but practically this does not matter because the time lag in transmitting pressure makes the passage shut off before the signal generator is actuated.

As explained above, the regulator according to the present invention secures the sealing vane in its open position while the tank is filled with liquid, and it automatically controls the flowing volume by the transposition of the sealing valve, effecting the same function as a throttled valve, enabling the pumping out of liquid from a tank. Another characteristic feature of the invention is that it is simple in construtcion, and easy and exact in function.

In the above embodiment, the movement of the float 14 is entirely dependent on the floating force and weight thereof; but if loaded with springs, the weight thereof can be reduced and effective floating force increased. It is also possible that the spring can replace the balance weight 11.

Another embodiment will be explained with reference to FIGS. 6 and 7. In this example, the automatic regulator *b* according to the invention is situated at the end of the main pipe *a*, and between the valve V and the regulator *b* is fixed a branch pipe *d* with a bellmouth closer to the bottom of the tank T than the bellmouth *c* in the preceeding example. The object of the branch pipe *d* and the bellmouth *c* being in pumping out the bottom layer of liquid, their cross section should necessaritly be smaller than that of the main pipe *a*.

Figure 7:
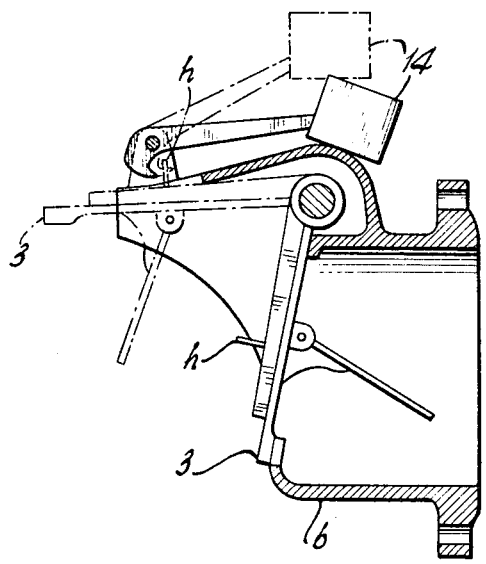
FIG. 7 is the vertical cross section at the center plane of the embodiment shown in FIG. 6.

The automatic regulator *b* in this example is shown in FIG. 7 in full: when the liquid comes down to a certain level in the tank T, the float 14 comes down to disengage the lock *h* due to the loss of floating force thereof, permitting the sealing vane 3 to come down and seal the end of the main pipe *a*; accordingly, the liquid is pumped through the bellmouth *c* and the branch pipe *d*. Needless to say, the liquid is pumped out through the main pipe *a* and the branch *d* until then.

Different from the preceding example, the sealing vane 3 has to close the end of the pipe fully, and therefore, there is no opening 4 as shown in the preceding example.

By this method, the same effect can be obtained as if the valve V is throttled, and the pumping-out operation can be automatically controlled. In this example, the signalling system to indicate the end of pumping is not specially shown, but a pressure actuating device or other proper mechanism can be provided for this purpose.

In the case of filling the tank T through the pipe line, the sealing vane is thrown up as in the preceding example, and locked in a horizontal position. It is needless to say that the incoming liquid also runs through the branch *d* and the bellmouth *c*.

Thus, it will be seen that with the structure of the invention there is a passage means formed by the pipe *a* and opening 4 of FIGS. 1–3 and by the pipe *a* and branch *d* of FIG. 6, the tank being filled and emptied by the flow of liquid through this passage means. A valve means coacts with the passage means to control the flow of fluid therethrough, and this valve means of the invention includes the movable vane or valve member 3 which is movable between a pair of end positions in one of which the passage means is fully open and in the other of which the passage means is only partly closed so as to throttle the flow of fluid therethrough. The float 14 forms a float means which responds to a change in the liquid level for actuating the releasable lock means 19 which coacts through the lever 10 and the shaft 2 with the movable valve member 3 for releasably locking the latter in that one of the above positions where the passage means is fully open, until the liquid level falls below a given elevation whereupon the float means releases the releasable lock means so as to release the valve member for movement to its other end position where the passage means is throttled. The weight 11 and the lever 11' form a weight means coacting through the shaft 2 with the movable valve member 3 to automatically situate the latter at a predetermined intermediate position which is between its end positions, when the tank is empty, and the bores 20–22 from a signalling means for signalling that the tank is empty when the weight means situates the valve member in its predetermined position intermediate its end positions.

I claim:

1. Automatic liquid pumping regulator comprising a tank, a pipe connected to said tank, valve means incorporated in said pipe and including a swingable sealing vane responding to the pressure of the incoming liquid through said pipe to be turned to an open position, a float movable with the surface of said liquid, lock means operably connected to said vane and to said float for locking said vane in its open position at a certain level of said liquid surface with floating force and to release said vane for movement away from said open position at a certain level of lowering liquid surface due to loss of the floating force of said float, a vane shaft and bearing therefor, said shaft and bearing being formed with holes bored in the shaft of said vane and in said bearing, said hole being in line to pass compressed air to a signal generator to warn the end of the pumping operation when said vane is in a predetermined position and the tank is empty.

2. In a flow regulating assembly, a tank, passage means communicating with the interior of said tank and through which said tank is filled and emptied, and valve means coacting with said passage means for regulating the fluid therethrough, said valve means having a movable member movable between a pair of end positions in one of which said passage means is fully open and in the other of which said passage means is only partly closed so as to throttle the flow of fluid when said valve member is in said other end position thereof, weight means coacting with said valve member for automatically situating the latter at a predetermined position intermediate said end positions thereof when the tank is empty, and signal means responding to location of said valve member by said weight means in said intermediate predetermined position for signalling that the tank is empty.

3. The combination of claim 2 and wherein a float means is situated in said tank in the region of said valve means for responding to changes in the level of a liquid in said tank, and releasable lock means actuated by said float means and operatively connected to said valve member for releasably locking the latter in said one end position where said passage means is fully open until the liquid level falls below a given elevation whereupon said float means actuates said lock means to release said valve member for movement to said other end position thereof.

4. An automatic regulator comprising, a tank, a pipe connected to said tank adapted to deliver liquid thereto, valve means in said pipe comprising a sealing vane rotatably mounted on a shaft arranged in a bearing for opening and closing movement, said vane arranged to be opened by the pressure of incoming liquid to the tank, a float responsive to the liquid level in the tank, lock means operatively associated with said float and said vane constructed in such a manner that a predetermined rise in the liquid level in the tank will effect locking of said vane when said vane is in a predetermined position, and unlocking of said vane will be effected upon a predetermined fall in the liquid level, said vane being normally biased toward a position intermediate opened and closed position, holes bored in said shaft and bearing arranged to pass a source of compressed air when said vane is in an intermediate position, warning signal producing means responsive to the passage of compressed air through said holes.

References Cited

UNITED STATES PATENTS

| | | | |
|---|---|---|---|
| 407,981 | 7/1889 | Williams | 137—513.3 |
| 2,266,930 | 12/1941 | Watson | 137—420 |
| 2,697,984 | 12/1954 | Pankratz | 103—22 |
| 3,166,091 | 1/1965 | Rudelick | 137—422 |

WILLIAM F. O'DEA, *Primary Examiner.*

H. M. COHN, *Assistant Examiner.*

UNITED STATES PATENT OFFICE
CERTIFICATE OF CORRECTION

Patent No. 3,395,721                                              August 6, 1968

Kiyoshi Shibata

It is certified that error appears in the above identified patent and that said Letters Patent are hereby corrected as shown below:

Column 4, line 6, after "liquid" cancel "with floating force".

Signed and sealed this 30th day of December 1969.

(SEAL)
Attest:

Edward M. Fletcher, Jr.                                     WILLIAM E. SCHUYLER, JR.
Attesting Officer                                                       Commissioner of Patents